US012421910B2

(12) United States Patent
Kodavasal et al.

(10) Patent No.: US 12,421,910 B2
(45) Date of Patent: *Sep. 23, 2025

(54) SYSTEMS AND METHODS FOR COLD OPERATION NOx BURDEN REDUCTION

(71) Applicants: Cummins Inc., Columbus, IN (US); Scania CV AB, Södertälje (SE)

(72) Inventors: Janardhan Kodavasal, Indianapolis, IN (US); Ved Merchant, Columbus, IN (US); Agneya Turlapati, Indianapolis, IN (US); Kristopher R. Bare, Columbus, IN (US)

(73) Assignees: Cummins Inc., Columbus, IN (US); Scania CV AB, Södertälje (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,096

(22) Filed: Mar. 12, 2024

(65) Prior Publication Data
US 2024/0254938 A1    Aug. 1, 2024

Related U.S. Application Data

(63) Continuation of application No. 18/075,053, filed on Dec. 5, 2022, now Pat. No. 11,970,991, which is a
(Continued)

(51) Int. Cl.
*F02D 41/02* (2006.01)
*F01N 3/023* (2006.01)
(Continued)

(52) U.S. Cl.
CPC ..... *F02D 41/0255* (2013.01); *F02D 41/1461* (2013.01); *F02D 41/3836* (2013.01);
(Continued)

(58) Field of Classification Search
CPC .......... F01N 3/021; F01N 3/0231; F01N 3/08; F01N 3/0807; F01N 3/0814;
(Continued)

(56) References Cited

U.S. PATENT DOCUMENTS 6,131,388 A    10/2000 Sasaki et al.
6,382,177 B1    5/2002 Saito
(Continued)

FOREIGN PATENT DOCUMENTS

DE    10 2020 005 209 A1    10/2020
EP    2 986 834 B1    2/2016
(Continued)

OTHER PUBLICATIONS

EPO Search Report dtd Jan. 30, 2024 re EPO Appl No. 23201813.5.
(Continued)

*Primary Examiner* — Binh Q Tran
(74) *Attorney, Agent, or Firm* — Foley & Lardner LLP

(57) ABSTRACT

A method includes initiating a low engine-out NOx (LEON) mode by controlling a component of a vehicle having an aftertreatment system to decrease an instantaneous engine-out NOx (EONOx) amount. The method also includes comparing a temperature of the aftertreatment system to a threshold temperature. The method also includes responsive to determining that the temperature of the aftertreatment system exceeds the threshold temperature, disengaging the LEON mode. The method also includes responsive to determining that the temperature of the aftertreatment system is below the threshold temperature, comparing a NOx value to a NOx value threshold. The method also includes disengaging the LEON mode responsive to determining that the NOx value exceeds the NOx value threshold.

20 Claims, 3 Drawing Sheets

Related U.S. Application Data continuation of application No. 17/544,069, filed on Dec. 7, 2021, now Pat. No. 11,519,350.

(60) Provisional application No. 63/123,210, filed on Dec. 9, 2020.

(51) Int. Cl.

| | | |
|---|---|---|
| *F01N 3/08* | (2006.01) | |
| *F01N 3/20* | (2006.01) | |
| *F01N 9/00* | (2006.01) | |
| *F01N 11/00* | (2006.01) | |
| *F02D 41/14* | (2006.01) | |
| *F02D 41/38* | (2006.01) | |
| *F02D 41/40* | (2006.01) | |

(52) U.S. Cl.
CPC .......... *F02D 41/405* (2013.01); *F01N 3/0231* (2013.01); *F01N 3/0807* (2013.01); *F01N 3/2006* (2013.01); *F01N 9/00* (2013.01); *F01N 9/005* (2013.01); *F01N 11/002* (2013.01); *F01N 11/005* (2013.01); *F01N 2410/06* (2013.01); *F01N 2430/06* (2013.01); *F01N 2550/03* (2013.01); *F01N 2570/14* (2013.01); *F01N 2900/1404* (2013.01); *F01N 2900/1602* (2013.01); *F01N 2900/1606* (2013.01); *F01N 2900/1611* (2013.01); *F01N 2900/1614* (2013.01); *F01N 2900/1622* (2013.01); *F01N 2900/1626* (2013.01); *F02D 2200/0802* (2013.01); *F02D 2200/0806* (2013.01); *F02D 2250/36* (2013.01)

(58) Field of Classification Search
CPC .... F01N 3/0821; F01N 3/0828; F01N 3/0842; F01N 3/0871; F01N 3/0885; F01N 3/10; F01N 3/2006; F01N 3/206; F01N 3/2066; F01N 3/208; F01N 9/00; F01N 9/005; F01N 11/002; F01N 11/005; F01N 2240/18; F01N 2250/12; F01N 2410/06; F01N 2430/06; F01N 2430/08; F01N 2550/03; F01N 2560/026; F01N 2560/06; F01N 2570/14; F01N 2570/145; F01N 2610/02; F01N 2900/06; F01N 2900/1404; F01N 2900/16; F01N 2900/1602; F01N 2900/1606; F01N 2900/1612; F01N 2900/1614; F01N 2900/1621; F01N 2900/1622; F01N 2900/1624; F01N 2900/1626; F01N 2900/1811; F02D 41/0255; F02D 41/027; F02D 41/0275; F02D 41/028; F02D 41/0285; F02D 41/146; F02D 41/1461; F02D 41/3836; F02D 41/405; F02D 2200/0802; F02D 2200/0806; F02D 2200/0808; F02D 2200/0818; F02D 2200/0811; F02D 2200/0812; F02D 41/0055; F02D 41/024; F02D 41/0065; F02D 41/068; F02D 2250/36; F02D 41/1463; F02D 41/40; Y02A 50/20; Y02T 10/12; B01D 53/9404; B01D 53/9409; B01D 53/9413; B01D 53/9418; B01D 53/9422; B01D 53/9427

See application file for complete search history.

(56) References Cited

U.S. PATENT DOCUMENTS

| | | |
|---|---|---|
| 6,892,530 B2 | 5/2005 | Montreuil et al. |
| 6,938,412 B2 | 9/2005 | Li et al. |
| 8,904,767 B2 | 12/2014 | Andersson et al. |
| 9,752,480 B2 | 9/2017 | Bergh et al. |
| 10,544,720 B2 | 1/2020 | Haas et al. |
| 11,519,350 B2 * | 12/2022 | Kodavasal ............ F02D 41/068 |
| 11,970,991 B2 * | 4/2024 | Kodavasal .......... F02D 41/0065 |
| 2005/0205037 A1 | 9/2005 | Lewis et al. |
| 2006/0212140 A1 * | 9/2006 | Brackney ............ F02D 41/1467 |
| | | 123/568.21 |
| 2010/0139249 A1 | 6/2010 | Alm et al. |
| 2011/0023591 A1 * | 2/2011 | Dobson ................. F02D 41/401 |
| | | 73/114.75 |
| 2011/0067679 A1 | 3/2011 | Hitomi et al. |
| 2011/0139136 A1 * | 6/2011 | Guo ....................... F02M 26/05 |
| | | 123/676 |
| 2011/0146235 A1 | 6/2011 | Hagimoto et al. |
| 2011/0192143 A1 | 8/2011 | Andersson et al. |
| 2013/0305695 A1 * | 11/2013 | Henry ..................... F01N 3/103 |
| | | 60/287 |
| 2014/0144414 A1 | 5/2014 | Dean et al. |
| 2015/0176512 A1 * | 6/2015 | Smith ................. F02D 41/0235 |
| | | 60/274 |
| 2015/0240682 A1 | 8/2015 | Gupta et al. |
| 2015/0247437 A1 * | 9/2015 | Ancimer ............... F01N 3/2006 |
| | | 60/297 |
| 2016/0084185 A1 * | 3/2016 | Theis ........................ F01N 9/00 |
| | | 701/105 |
| 2017/0114697 A1 | 4/2017 | Zambrano et al. |
| 2019/0284978 A1 | 9/2019 | De Smet et al. |
| 2020/0095916 A1 * | 3/2020 | Haas ................... F02D 41/1465 |

FOREIGN PATENT DOCUMENTS

| | | |
|---|---|---|
| GB | 2 513 137 A | 10/2014 |
| WO | WO-00/60229 A1 | 10/2000 |
| WO | WO-2018/096292 | 5/2018 |

OTHER PUBLICATIONS

Foreign Search Report on EP 21212749.2 Dtd May 11, 2022.
Non-Final Office Action on U.S. Appl. No. 18/075,053 Dtd Jul. 5, 2023.
Notice of Allowance on U.S. Appl. No. 17/544,069 Dtd Aug. 4, 2022.
Notice of Allowance on U.S. Appl. No. 18/075,053 Dtd Dec. 7, 2023.

* cited by examiner

SYSTEMS AND METHODS FOR COLD OPERATION NOx BURDEN REDUCTION

CROSS-REFERENCE TO RELATED PATENT APPLICATIONS

This application is a continuation of U.S. application Ser. No. 18/075,053, filed Dec. 5, 2022, which application is a continuation of U.S. application Ser. No. 17/544,069, filed Dec. 7, 2021, which claims the benefit of and priority to U.S. Provisional Patent Application No. 63/123,210, filed Dec. 9, 2020, all of which are incorporated herein by reference in their entireties and for all purposes.

TECHNICAL FIELD

The present disclosure relates generally to a system for reducing nitrogen oxides (NOx) emissions during cold operating times, such as when a vehicle housing an engine and an aftertreatment system is started and the aftertreatment system is not yet warmed up to an extent that appreciably reduces the NOx.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set acceptable emission standards, to which all engines must comply. Consequently, the use of exhaust aftertreatment systems on engines to reduce emissions is increasing. A common component in many of these exhaust aftertreatment systems is a selective catalytic reduction (SCR) system, which reduces nitrous oxide (NOx) present in the exhaust gas by injecting a reductant into the flow of exhaust combined with the exhaust gas interacting with a catalyst. The catalyst reacts with the exhaust gas to form harmless nitrogen and water. However, the SCR is most effective at elevated operating temperatures, which means that its efficacy at colder temperatures is diminished.

SUMMARY

One embodiment relates to a method. The method comprises determining, based on a current temperature of an aftertreatment system, that the aftertreatment system is in a cold-operation mode; initiating a low engine-out NOx (LEON) mode by controlling a component of the vehicle to decrease an engine out NOx (EONOx) amount and to increase the exhaust energy relative to a normal operation mode for an engine of the vehicle; receiving information indicative of an operating status of the vehicle during the LEON mode; based on the information indicative of the operating status of the vehicle during LEON mode, disengaging the LEON mode; subsequent to disengaging the LEON mode, initiating a thermal management (TM) mode for the aftertreatment system based on the information indicative of the operating status of the vehicle during the LEON mode, wherein the TM mode is initiated by controlling a component of the vehicle to increase the fueling to the engine for a power level by reducing engine efficiency and directing excess fuel to the aftertreatment system; receiving information indicative of an operating status of the vehicle during the TM mode; and based on the information indicative of the operating status of the vehicle during TM mode, disengaging the TM mode.

In some of these embodiments, the information indicative of the operating status of the vehicle during the LEON mode includes at least one of a temperature of an aftertreatment system of the vehicle, a temperature of exhaust exiting the engine, a conversion efficiency of an selective catalytic reduction (SCR) catalyst of the aftertreatment system, a cumulative amount of system-out NOx, or a cumulative amount of soot on a diesel particulate filter (DPF) of the aftertreatment system. In other of these embodiments, the information indicative of the operating status of the vehicle during the TM mode includes at least one of a temperature of an aftertreatment system of the vehicle or a conversion efficiency of a selective catalytic reduction (SCR) catalyst of the aftertreatment system.

In further of these embodiments, disengaging the LEON mode is based on comparing the information indicative of the operating status of the vehicle during the LEON mode to one or more corresponding thresholds. In yet others of these embodiments, engaging the LEON mode includes at least one of increasing an exhaust gas recirculation (EGR) amount, retarding fuel injection timing, or modifying a common rail fuel pressure.

Another embodiment relates to a system that includes an aftertreatment system and a controller coupled to the aftertreatment system. The controller is configured to determine, based on a current temperature of the aftertreatment system, that the aftertreatment system is in a cold-operation mode; initiate a low engine-out NOx (LEON) mode by controlling a component of a vehicle containing the aftertreatment system to decrease an instantaneous engine-out NOx (EONOx) amount and to increase exhaust energy relative to a normal operation mode for an engine of the vehicle; receive information indicative of an operating status of the vehicle during the LEON mode; based on the information indicative of the operating status of the vehicle during LEON mode, disengage the LEON mode; subsequent to disengaging the LEON mode, initiate a thermal management (TM) mode for the aftertreatment system based on the information indicative of the operating status of the vehicle during the LEON mode, wherein the TM mode is initiated by controlling a component of the vehicle to increase fueling to the engine for a power level by reducing engine efficiency and directing excess fuel to the aftertreatment system; receive information indicative of an operating status of the vehicle during the TM mode; and based on the information indicative of the operating status of the vehicle during TM mode, disengage the TM mode.

Another embodiment relates to a controller for an aftertreatment system. The controller includes one or more processors and memory storing instructions that, when executed by the one or more processors, cause the one or more processors to: determine, based on a current temperature of the aftertreatment system, that the aftertreatment system is in a cold-operation mode; initiate a low engine-out NOx (LEON) mode by controlling a component of a vehicle containing the aftertreatment system to decrease an engine-out NOx (EONOx) amount and to increase exhaust energy relative to a normal operation mode for an engine; receive information indicative of an operating status of the vehicle during the LEON mode; based on the information indicative of the operating status of the vehicle during LEON mode, disengage the LEON mode; subsequent to disengaging the LEON mode, initiate a thermal management (TM) mode for the aftertreatment system based on the information indicative of the operating status of the vehicle during the LEON mode; receive information indicative of an operating status of the vehicle during the TM mode; and based on the information indicative of the operating status of the vehicle during TM mode, disengage the TM mode.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
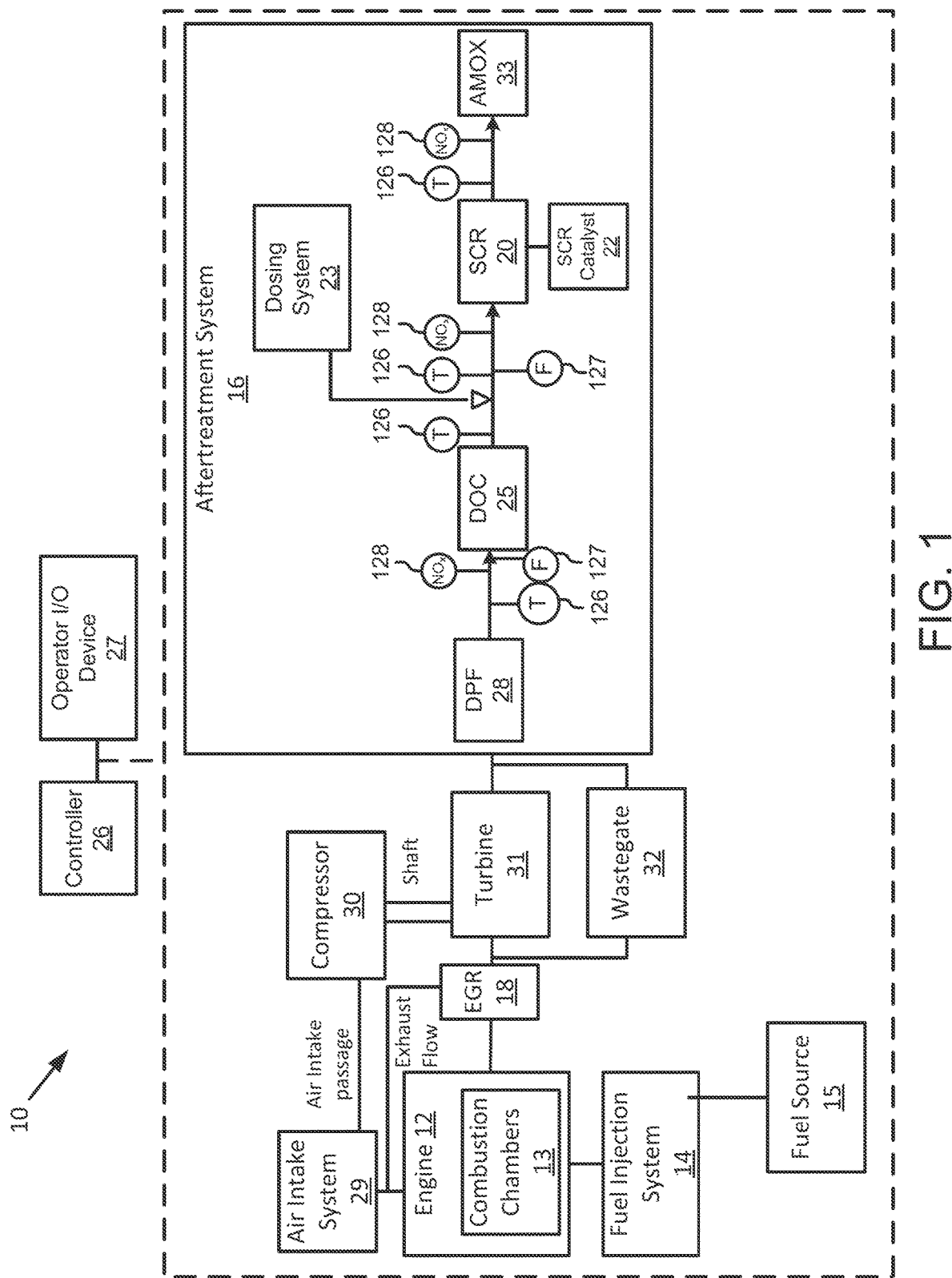
FIG. 1 is a schematic diagram of a system with a controller, according to an exemplary embodiment.

Following below are more detailed descriptions of various concepts related to, and implementations of, methods, apparatuses, and systems for operating and controlling an aftertreatment system during a cold-start warm-up period. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting. For instance, as used within, "optimizing" should also be construed as including "nearly optimizing" or "substantially optimizing."

Referring to the figures generally, the various embodiments disclosed herein relate to systems, apparatuses, and methods for operating an aftertreatment system during a cold-start warm-up period.

A main component of exhaust gas aftertreatment systems is a Selective Catalytic Reduction (SCR) system that utilizes a two-step process to reduce harmful NOx emissions present in exhaust gas. First, a doser injects a reductant into the exhaust stream. This reductant may be a urea, diesel exhaust fluid (DEF), Adblue®, a urca water solution (UWS), an aqueous urea solution (e.g., AUS32, etc.), or another similar fluid that chemically binds to particles in the exhaust gas. Then, this mixture is run through an SCR catalyst that, when at a certain temperature, such as an SCR light off temperature (e.g., the temperature at which the SCR catalyst begins reacting), causes a reaction in the mixture that converts at least some of the harmful NOx particles into pure nitrogen and water. However, if the catalyst is not at the proper temperature, this conversion will not happen or will happen at a lower efficiency. Therefore, maintaining the catalyst temperature at a desired temperature or temperature range is impactful on the conversion efficiency of the catalyst. Heating the catalyst from a cold soak (or cold start) presents some difficulty. A common method of heating the SCR catalyst is to provide exhaust energy from the engine's hot exhaust gas (e.g., a high exhaust energy or HEE mode). However, in those situations in which the engine is starting from a cold soak (i.e., when the engine has been left off for an extended period of time, such as more than one hour), the SCR catalyst is not yet at the desired temperature, so the hot exhaust gas being provided from the engine is not being properly treated or reduced. Additionally, typical methods to elevate exhaust energy significantly compared to a normal, warm operation mode, result in a significantly higher EONOx flux from the engine system. As such, high levels of harmful NOx and hydrocarbon gases are being released into the atmosphere at possibly unacceptable or undesirable levels (e.g., exceeding one or more emissions regulations). In other words, trying to produce hot exhaust gas to heat the catalyst when the catalyst is not at a desired operating temperature may lead to the catalyst not reducing the harmful components in the exhaust gas during this warmup period. Therefore, balancing heating the SCR catalyst while keeping NOx and other regulated emissions low is desired. It is desirable that the catalyst reaches the operating temperature from a cold condition in a time span that is consistent with the rate of production of NOx emissions from the engine. A high rate of engine emissions during the warm-up period (such as in TM or HEE mode) dictates that the catalyst warms up quickly. A low emissions rate (such as in LEON mode) may allow the catalyst to warm up more slowly. Thus, both these cold operation modes (TM/HEE and LEON) have their respective advantages, and disadvantages. While TM mode allows the catalyst to warm up faster (relative to LEON mode), TM mode also generates a high level of untreated EONOx in that shorter period. While LEON mode takes a longer time to warm up the SCR (relative to TM mode), the flux of EONOx in that longer period is much lower than in TM mode. It is difficult without knowledge of drive cycles which mode will lead to an overall lower cumulative system out NOx (SONOx) penalty before catalyst warmup. Embodiments described herein balance these two modes to minimize overall SONOx put out into the environment during cold operation, for any unknown drive cycle.

As shown in FIG. 1, a system 10 including an engine 12, an aftertreatment system 16 coupled to the engine 12, a controller 26, and an operator input/output (I/O) device 27 is shown, according to an example embodiment. In this exemplary embodiment, the system 10 is implemented with an on-road or an off-road vehicle including, but not limited to, line-haul trucks, mid-range trucks (e.g., pick-up truck, etc.), sedans, coupes, tanks, airplanes, boats, and any other type of vehicle. In other embodiments, the system may be implemented with stationary pieces of equipment like power generators or gen-sets. The system 10 may mitigate high NOx and other harmful emissions during a warmup period for the engine and catalyst of the aftertreatment system.

The engine 12 may be any type of engine that generates exhaust gas, such as an internal combustion engine (e.g., compression ignition or a spark ignition engine that may utilize various fuels, such as natural gas, gasoline, diesel fuel, jet fuel, etc.), a hybrid engine (e.g., a combination of an internal combustion engine and an electric motor), or any other suitable engine. The engine 12 includes one or more cylinders and associated pistons. In this regard, air from the atmosphere is combined with fuel, and combusted, to power the engine 12. Combustion of the fuel and air in combustion chambers 13 of the engine 12 produces exhaust gas that is operatively vented to an exhaust pipe and to the aftertreatment system 16. In the example shown, the engine 12 is structured as an internal combustion engine and particularly, a compression-ignition engine powered by diesel fuel.

The system 10 is also shown to include an air intake system 29 structured to deliver a flow of air into the combustion chambers 13 of the engine 12, and a fuel injection system 14 structured to receive fuel from a fuel source 15 (e.g., fuel tank) and inject fuel into the combustion chambers 13 of the engine 12. In one embodiment and as shown, the fuel injection system 14 delivers the fuel to the engine 12 via a common rail. In these embodiments, the pressure of the common rail can be managed in order to affect the atomization of the fuel as the fuel is injected. Greater common rail pressure begets greater production of NOx. In some embodiments, the fuel injection system 14 may utilize a multiple injection cycle such that a main injection of fuel for combustion is followed by another, smaller injection of fuel. Injections following the main injection for combustion are known as post-injections. Post injection refers to fuel that is injected later in the combustion stroke—which may or may not combust in the cylinder. By altering the quantities and timings of the multiple injection cycle, the amount of NOx being produced by the engine 12 can be controlled. For example, retarding fuel injection timing in the fuel injection system 14 can decrease the NOx output from the engine 12.

The air intake system 29 is coupled to an EGR system 18 that includes an EGR valve that directs a portion of the exhaust gas from the engine 12 back towards the engine 12 rather than allowing that exhaust gas to pass through the aftertreatment system 16 and into the atmosphere. By mixing the exhaust gas with the intake air in the combustion chambers 13 of the engine 12, thermal characteristics of the combustion charge are altered such that in certain situations lower NOx or other undesired emission products is produced. Additionally, more EGR may result in higher particulate matter emissions. However, additional EGR amounts may lead to a reduction in some emission types, such as NOx, due to EGR tending to lower combustion temperatures. The system 10 may also include an EGR cooler position upstream of the engine 12 to reduce the temperature of the hot exhaust gases prior to mixing with fresh intake charge to improve thermal efficiency of combustion by reducing charge temperatures. Flowing EGR can come with a "pumping" penalty, increasing engine fuel consumption to maintain a given power level. The power level refers to a power output from the engine. Based on various conditions, this power level corresponds with specific fueling for a given brake specific fuel consumption (BSFC). As described herein, excess fueling (e.g., above the fueling required to maintain the BSFC (e.g., a specific or given power level) may be commanded in the TM mode by intentionally reducing engine efficiency by means such as overclosing the VG or applying an exhaust throttle, and directing at least some (in particular, a majority of the excess fuel energy) to the aftertreatment system. Manipulating the EGR amount can affect emission characteristics as well as engine efficiency.

As also shown in FIG. 1, the system 10 includes a turbocharger that is shown as a combination of a compressor 30 and a turbine 31. Exhaust gas of the combustion is discharged to the turbine 31, which is mechanically coupled to the compressor 30 through, for example, a shaft, and drives the compressor 30. A wastegate 32 can enable part of the exhaust gas to bypass the turbine 31, resulting in less power transfer to the compressor 30. A combination of bypass and turbine flow enters the aftertreatment system 16 for aftertreatment before being released to the atmosphere. In one embodiment, the system 10 may include a Variable Geometry Turbine (VGT) instead of the wastegate 32. The VGT is structured to flexibly modulate the power transferred to the turbine 31 by changing a position of a valve of the VGT. The compressor 30 may compress air before the air is aspirated into the air intake system 29 through an air intake passage, thereby increasing the temperature and pressure of the air flow. The system 10 may also include a charge air cooler that is positioned downstream of the compressor 30 and is structured to reduce the temperature and increase a density of the intake air, thereby improving efficiency by reducing loss due to the increase in temperature of the air from compression. Operation of the turbocharger also affects exhaust energy output from the system 10. In some embodiments, the air intake system 29 includes an air intake manifold, an air intake throttle, and/or an air intake valve structured to control access of the air to the combustion chambers 13.

As the exhaust gas drives the turbine 31 to rotate, the compressor 30 compresses the air supplied to the combustion chambers 13 of the engine 12. The wastegate 32, by diverting some exhaust gas from the turbine 31, reduces the power transferred to the compressor 30, thereby reducing the rate at which the air flow is supplied to the combustion chambers 13 of the engine 12. Conversely, if the wastegate 32 is closed, all or mostly all of the exhaust gas is directed to the turbine 31, increasing the amount of power transferred to the compressor 30 and increasing the rate of air flow into the combustion chambers 13 of the engine. In one embodiment in which the wastegate 32 is replaced by the VGT, the VGT may change the turbine power by controlling the vane position in the VGT. The VGT allows the system to achieve an optimum aspect ratio. If the aspect ratio is large (i.e. more opened) the power transferred by the turbine 31 to the compressor 30 is low, thus reducing an achievability of a high boost pressure (e.g. at idle). Conversely, if the aspect ratio is small (i.e. less opened), the power transferred by the turbine 31 to the compressor 30 is high, and thereby the compressor can supply more air to the combustion chamber through the air intake system 29. Altering operation of the turbocharger can affect combustion efficiency. For example, increasing the air flow (i.e. a smaller aspect ratio) increases the air content of the air-fuel mixture in the combustion chambers 13, which increases a combustion efficiency of the mixture. Combustion efficiency refers to how much energy is being extracted from a given amount of provided fuel. One-hundred percent combustion efficiency indicates that all of the energy in the amount of fuel has been extracted into useful work. This level of combustion efficiency is practically not obtainable given the dynamics of an engine system and the losses associated therewith. Other functions of the VGT include increasing back pressure (exhaust pressure) to drive EGR, and in other instances overclosing or opening completely to significantly diminish turbocharger efficiency with the objective of overfueling the engine at a given power level to divert a higher fraction of the fuel energy into the exhaust stream for aftertreatment thermal management, or to function as an engine brake. Together with operation of the turbocharger, operation of the EGR system 18 can affect combustion stability and emissions from the engine (e.g., NOx, HC, PM, etc.). High fractions of air in the air intake system 29 caused by high compressor 30 power (i.e. a "leaner" combustion) may enhance combustion stability, thereby reducing PM and HC emissions. However, such leaner combustion may lead to high combustion temperatures, thereby producing more NOx. Optimal operation of the turbocharger and EGR system 18 can allow the engine 12 to achieve optimal combustion efficiency while minimizing emissions through changing conditions. In one embodiment, there is an exhaust throttle valve (ETV) downstream of the turbine of the turbocharger which is used to modulate engine backpressure and pumping for applications like engine braking and aftertreatment thermal management.

A combination of bypass flow and turbine flow may enter the aftertreatment system 16. The aftertreatment system 16 is shown to include an SCR system 20.

The SCR system 20 is structured to receive exhaust gas in a decomposition chamber (e.g. reactor, reactor pipe, etc.), in which the exhaust gas is combined with a reductant, which may be, for example, urea, diesel exhaust fluid (DEF), Adblue®, a urca water solution (UWS), an aqueous urea solution (e.g., AUS32, etc.), or other similar fluids. An amount of reductant is metered by a dosing system 23. The decomposition chamber includes an inlet in fluid communication with the EGR system 18 to receive the exhaust gas containing NOx emissions and an outlet for the exhaust gas-reductant mixture to flow to a SCR catalyst 22. The SCR catalyst 22 is configured to assist in the reduction of NOx emissions by accelerating a NOx reduction process between the reductant and the NOx of the exhaust gas into diatomic nitrogen, water, and/or carbon dioxide. The SCR catalyst 22 may be made from a combination of an inactive material and an active catalyst, such that the inactive material, (e.g. ceramic metal) directs the exhaust gas towards the active catalyst, which is any sort of material suitable for catalytic reduction (e.g. base metals oxides like vanadium, molybdenum, tungsten, etc. or noble metals like platinum). If the SCR catalyst 22 is not at or above a certain temperature, the rate of the NOx reduction process is limited and the SCR system 20 will not operate at a desired level of efficiency to meet various regulations. In some embodiments, this certain temperature is a temperature range corresponding to 250-300° C. In other embodiments, the certain operating temperature corresponds with the conversion efficiency of the SCR catalyst 22 meeting or exceeding a pre-defined conversion efficiency threshold (e.g., sixty-percent as in sixty-percent of NOx is converted to less harmful elements). Other catalyst elements in the system such as a DOC or AMOX may also desired increased temperature levels to achieve desired operating efficiencies (e.g., NOx reduction or other emissions type) and, in turn, have their own certain desired operating temperature thresholds or ranges.

The efficiency of the NOx reduction process is also affected by the amount of reductant injected into the decomposition chamber by the dosing system 23. Generally, the more reductant that is present in the resultant exhaust gas-reductant mixture, the more of the NOx in the exhaust gas that is reduced. Although there is a point at which too much reductant in the mixture can lead to a separate set of problems (e.g. ammonia slip). The general principle is that increasing the amount of reductant injected by the dosing system 23 improves the reductive capabilities of the SCR system 20, thereby reducing the amount of NOx and other regulated emissions released into the atmosphere. In some embodiments, the aftertreatment system 16 includes an ammonia oxidation catalyst (AMOX) 27 that is structured to address ammonia slip by removing excess ammonia from the treated exhaust gas before the treated exhaust is released into the atmosphere.

In some embodiments, the aftertreatment system 16 further includes a diesel oxidation catalyst (DOC) 25 that is structured to receive a flow of exhaust gas and to oxidize hydrocarbons and carbon monoxide in the exhaust gas. In some embodiments and depending on the system architecture, the aftertreatment system 16 may further include a three-way catalyst (not shown) that is structured to receive a flow of exhaust gas and to reduce NOx into nitrogen and water and to oxidize hydrocarbons and carbon monoxide in the exhaust gas (i.e. perform the combined functions of the SCR catalyst 22 and of the DOC 25). The aftertreatment system 16 may also include a diesel particulate filter (DPF) 28 is arranged or positioned downstream of the DOC 25 and structured to remove particulates, such as soot, from exhaust gas flowing in the exhaust gas stream. The DPF 28 includes an inlet, where the exhaust gas is received, and an outlet, where the exhaust gas exits after having particulate matter substantially filtered from the exhaust gas and/or converting the particulate matter into carbon dioxide. In some implementations, the DPF 28 may be omitted.

Figure 2:
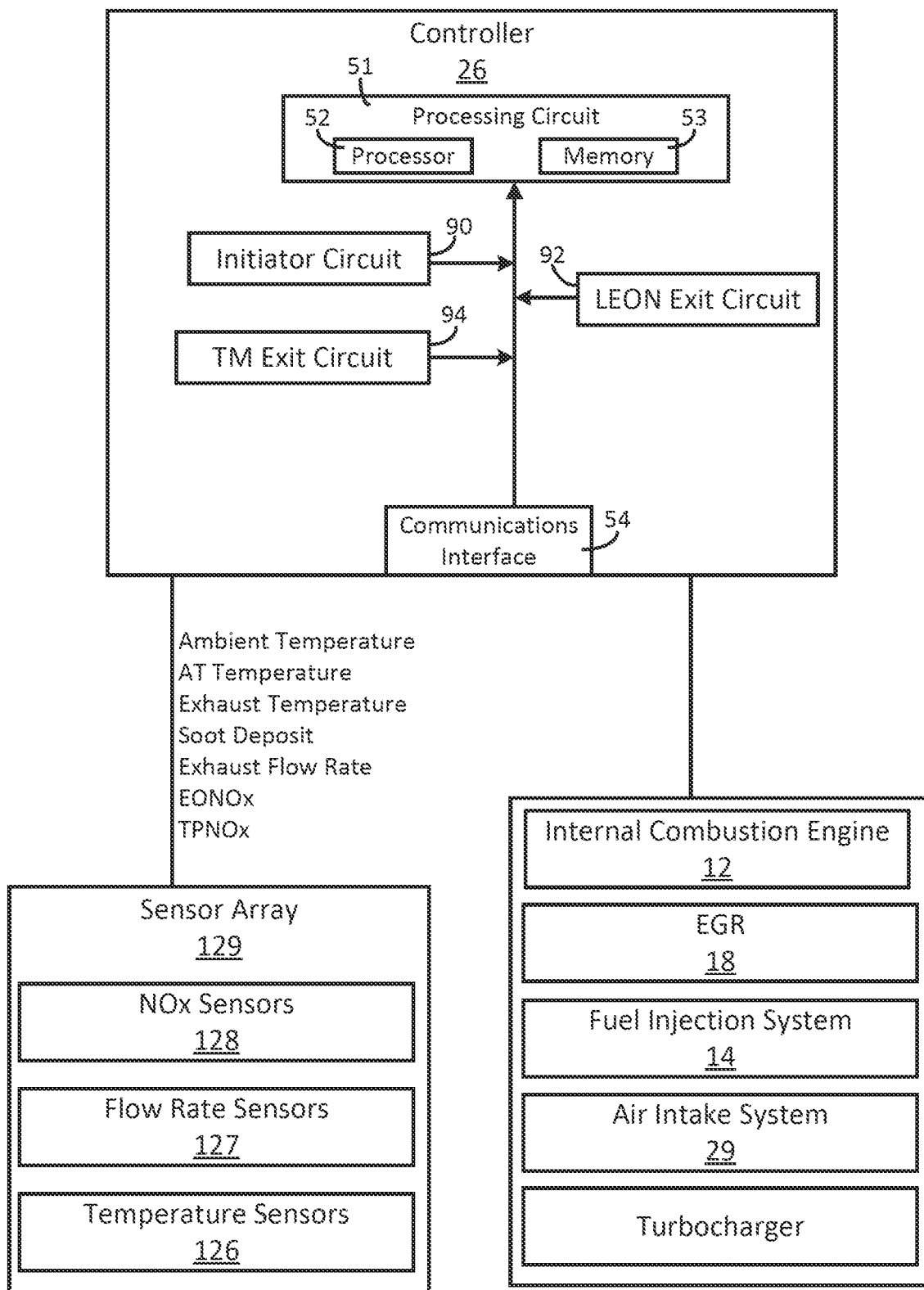
FIG. 2 is a schematic diagram of the controller of the system of FIG. 1, according to an exemplary embodiment.

Briefly referencing FIG. 2, as also shown, a sensor array 129 is included in the aftertreatment system 16. The sensors are coupled to the controller 26, such that the controller 26 can monitor and acquire data indicative of operation of the vehicle and system 10. In this regard, the sensor array includes NOx sensors 128, flow rate sensors 127, and temperature sensors 126. The NOx sensors 128 acquire data indicative of or, if virtual, determine a NOx amount at or approximately at their disposed location. The flow rate sensors 127 acquire data indicative of or, if virtual, determine an approximate flow rate of the exhaust gas at or approximately at their disposed location. The temperature sensors 126 acquire data indicative of or, if virtual, determine an approximate temperature of the exhaust gas at or approximately at their disposed location. It should be understood that the depicted locations, numbers, and type of sensors is illustrative only. In other embodiments, the sensors may be positioned in other locations, there may be more or less sensors than shown, and/or different/additional sensors may also be included with the system 10 (e.g., a pressure sensor, etc.). Those of ordinary skill in the art will appreciate and recognize the high configurability of the sensors in the system 10.

The controller 26 is structured or configured to control the system 10 in order to balance usage of special operation modes, which include a Low Engine-Out NOx (LEON) mode and a Thermal Management (TM) mode, in order to keep an overall tailpipe NOx (TPNOx) burden below a threshold during the period of 'cold operation,' with is defined as a period of time from a 'cold start' to 'warm operation.' "Cold start" refers to the period of time when a temperature of the aftertreatment system 16 (e.g., of the aftertreatment system 16 generally, of the SCR catalyst 22, etc.) is at or near a low temperature threshold. "Warm operation" refers to the temperature of the aftertreatment system 16 (e.g., of the aftertreatment system generally, of the SCR catalyst 22, etc.) at or near an operating temperature threshold. In some embodiments, this operating temperature threshold is a temperature range corresponding to 250-300° C. In other embodiments, the certain operating temperature corresponds with the conversion efficiency of the SCR catalyst 22 meeting or exceeding a pre-defined conversion efficiency threshold (e.g., sixty-percent as in sixty-percent of NOx is converted to less harmful elements). Overall, the TPNOx (also referred to as System Out NOx—SONOx) burden during cold operation is a function of a rate of Engine-Out NOx (EONOx) and the time taken for the SCR catalyst 22 to reach temperatures that provide acceptable conversion efficiency. This period of time is defined herein as the "cold start" to "warm operation" time range.

LEON mode refers to a low EONOx operating mode. During the LEON mode, the controller 26 prioritizes a lower EONOx rate (by, e.g., retarding fuel injection timing, increasing EGR amounts, etc.) to reduce the TPNOx burden that typically comes at the expense of fuel consumption compared to normal operation mode operation with a warmed up SCR for a particular point in time (particularly, up until SCR 22 reaches a suitable temperature for an acceptable NOx conversion efficiency). Lower EONOx rates generally follow from increased EGR levels. Whereas in TM mode (also known as High Exhaust Energy (HEE) mode), the system 10 is biased to significantly increase exhaust enthalpy (in relation to normal operation mode as indicated below), at the expense of significantly higher EONOx (due to significantly higher fueling needed, a large portion of which is directed to the exhaust). In comparison to normal operation mode, LEON mode biases the engine system to reduce EONOx significantly (in relation to Normal mode), while moderately increasing exhaust energy in comparison to normal mode.

Another operating mode includes a thermal management for the engine (TM mode). In comparison to the LEON mode, the TM mode, also known as High Exhaust Energy (HEE) mode, prioritizes a shorter colder operation period by increasing exhaust enthalpy intensity (e.g., restrictive engine breathing leading to over-fueling the engine 12, etc.), which leads to a higher amount of $CO_2$ and a higher EONOx burden because the methods used to increase exhaust enthalpy intensity generally result in higher NOx production. In operation and as described herein, the controller 26 selectively prioritizes the lower EONOx rate (via the LEON mode) or the higher EONOx rate (via the TM mode) in order to optimize the overall cold-operation NOx burden.

The controller 26 is configured to engage the LEON mode upon start-up, if the temperature of the aftertreatment system 16 (or of the SCR catalyst 22 in particular) qualifies the system 10 as being in cold operation and as below a threshold (particularly, a temperature threshold) for initiating the LEON mode. The controller 26 maintains the LEON mode until the controller 26 determines that the LEON mode is insufficient. This determination is made based on an analysis and evaluation of operating parameters in real-time comparison to operating thresholds (e.g., an amount of TPNOx). For example, if the amount of TPNOx exceeds a predefined threshold, the controller 26 determines that LEON mode is insufficient for the task of warming the SCR catalyst 22 within a NOx budget. The amount of TPNOx may be, in some embodiments, estimated using the speed/load trajectory of the system 10 to consult a steady-state EONOx map, which is stored in the memory 53 or as part of a virtual NOx sensor. The predefined threshold is based on an amount of TPNOx that indicates that the system 10 will exceed or is exceeding an acceptable amount of NOx emissions prior to the SCR catalyst reaching an operating temperature based on the lower enthalpy intensity of LEON mode. If the controller 26 determines that LEON mode is insufficient, the controller 26 exits LEON mode and initiates the TM mode. The TM mode is employed to rapidly warm up the aftertreatment system 16 at the cost of higher instantaneous EONOx (and thus higher TPNOx prior to warm operation). Once the controller 26 determines that the aftertreatment system 16 is no longer in cold operation based on the temperature of the aftertreatment system 16 (e.g., of the aftertreatment system 16 generally, of the SCR catalyst 22, etc.) exceeding an operating temperature threshold, the controller 26 disengages whichever special operation mode (LEON or TM) is currently engaged and initiates normal operation of the system 10.

As the components of FIG. 1 are shown to be embodied in the system 10 of the vehicle, the controller 26 may be structured as one or more electronic control units (ECU). The function and structure of the controller 26 is described in greater detail in FIG. 2.

Referring now to FIG. 2, a schematic diagram of the controller 26 of the system 10 of FIG. 1 is shown according to an example embodiment. As shown in FIG. 2, the controller 26 includes a processing circuit 51 having a processor 52 and a memory 53, a initiator circuit 90, a LEON exit circuit 92, a TM exit circuit 94, and a communications interface 54. Generally, the controller 26 is structured to determine a proper operating mode for the system 10 and to control components of the system in order to manage transitions between the operating modes.

In one configuration, the initiator circuit 90, the LEON exit circuit 92, and the TM exit circuit 94 are embodied as machine or computer-readable media storing instructions that are executable by a processor, such as processor 52. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media instructions may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the initiator circuit 90, the LEON exit circuit 92, and the TM exit circuit 94 are embodied as hardware units, such as electronic control units. As such, the initiator circuit 90, the LEON exit circuit 92, and the TM exit circuit 94 may be embodied as one or more circuitry components including, but not limited to, processing circuitry, network interfaces, peripheral devices, input devices, output devices, sensors, etc. In some embodiments, the initiator circuit 90, the LEON exit circuit 92, and the TM exit circuit 94 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the initiator circuit 90, the LEON exit circuit 92, and the TM exit circuit 94 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The initiator circuit 90, the LEON exit circuit 92, and the TM exit circuit 94 may also include programmable hardware devices such as field programmable gate arrays, programmable array logic, programmable logic devices or the like. The initiator circuit 90, the LEON exit circuit 92, and the TM exit circuit 94 may include one or more memory devices for storing instructions that are executable by the processor(s) of the initiator circuit 90, the LEON exit circuit 92, and the TM exit circuit 94. The one or more memory devices and processor(s) may have the same definition as provided below with respect to the memory 53 and processor 52. In some hardware unit configurations, the initiator circuit 90, the LEON exit circuit 92, and the TM exit circuit 94 may be geographically dispersed throughout separate locations in the vehicle. Alternatively and as shown, the initiator circuit 90, the LEON exit circuit 92, and the TM exit circuit 94 may be embodied in or within a single unit/housing, which is shown as the controller 26.

In the example shown, the controller 26 includes the processing circuit 51 having the processor 52 and the memory 53. The processing circuit 51 may be structured or configured to execute or implement the instructions, commands, and/or control processes described herein with respect to the initiator circuit 90, the LEON exit circuit 92, and the TM exit circuit 94. The depicted configuration represents the initiator circuit 90, the LEON exit circuit 92, and the TM exit circuit 94 as machine or computer-readable media storing instructions. However, as mentioned above, this illustration is not meant to be limiting as the present disclosure contemplates other embodiments where the initiator circuit 90, the LEON exit circuit 92, and the TM exit circuit 94, or at least one circuit of the initiator circuit 90, the LEON exit circuit 92, and the TM exit circuit 94, is configured as a hardware unit. All such combinations and variations are intended to fall within the scope of the present disclosure.

The processor 52 may be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the initiator circuit 90, the LEON exit circuit 92, and the TM exit circuit 94 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory 53 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory 53 may be communicably connected to the processor 52 to provide computer code or instructions to the processor 52 for executing at least some of the processes described herein. Moreover, the memory 53 may be or include tangible, non-transient volatile memory or non-volatile memory. Accordingly, the memory 53 may include database components, object code components, script components, or any other type of information structure for supporting the various activities and information structures described herein.

The initiator circuit 90 is configured or structured to receive information indicative of a starting the vehicle in which the system 10 is contained and to determine an initial operating mode. The "starting" of the vehicle may be based on receiving an indication of a push-button start, a key-on position, or any other operating point that indicates that the engine has been turned on. The initial operating mode refers to the mode of operation for the system upon starting (e.g., LEON mode, TM mode, normal operation mode). In addition to the information indicating whether the vehicle and engine are "on," additional information at and during starting includes a temperature of the aftertreatment system 16, a temperature of the SCR catalyst 22, an ambient temperature around the vehicle, etc. The temperature of the aftertreatment system 16 may be determined by the temperature sensors(s) 126. The temperature may be a temperature of a particular component of the aftertreatment system 16 (such as of the SCR catalyst 22), an average temperature of a component of interest of the aftertreatment system 16, or as a temperature of the exhaust gas entering the aftertreatment system 16 (or at another location). In some embodiments, the determination of the initial operating mode is based on a temperature of the aftertreatment system 16. In other embodiments, the determination includes a consideration of the ambient temperature. Once the controller 26 receives the temperature(s) from the various sensor(s) of the sensor array 129, the initiator circuit 90 compares the temperature(s) to one or more threshold(s). In one embodiment, the initiator circuit 90 compares the temperature of the aftertreatment system 16 to a cold-operation threshold. If the temperature of the aftertreatment system 16 is below the cold-operation threshold, the initiator circuit 90 determines that the aftertreatment system 16 is experiencing a cold-operation condition. This cold-operation threshold may be a predefined value of a desired operating temperature of the aftertreatment system 16. The threshold may be specific to certain components or to the system 16 as a whole. If the temperature of the aftertreatment system 16 is below the cold-operation threshold, the controller 26 determines that the aftertreatment system 16 is below a desired operating temperature, such that the aftertreatment system 16 is not effectively reducing harmful components in the exhaust gas (e.g., NOx). If the temperature of the aftertreatment system 16 is at or above the cold-operation threshold, the initiator circuit 90 determines that the initial operating mode for the system 10 is normal operation (i.e., the vehicle is already prepared for warm operation and is focused on optimizing fuel efficiency).

Once the initiator circuit 90 determines that the aftertreatment system 16 is in a cold-operation condition, the initiator circuit 90 compares the aftertreatment system 16 temperature to a LEON mode entry threshold. If the temperature of the aftertreatment system 16 is below the LEON mode entry threshold, the initiator circuit 90 determines that the initial operating mode for the system 10 is LEON mode. In some embodiments in which avoiding the LEON mode is preferred (such as for performance considerations), the LEON mode entry threshold is a first temperature (e.g., 50° C.), so that the system 10 is initiated in LEON mode substantially only when the system 10 is started from a complete cold-start. In other embodiments in which LEON is a preferred initial mode, the LEON entry threshold is a second temperature that is substantially the same as the cold-operation threshold (e.g., 180-200° C., so that the system 10 is initiated in LEON is almost every scenario except those in which the system 10 is already prepared for warm-operation.

The initiator circuit 90 engages LEON mode by sending command signals to various components of the system 10 to adjust performance and achieve or substantially achieve low EONOx. For example, the initiator circuit 90 commands the EGR system 18 to increase an EGR amount returning to the combustion chambers 13, In another example, the initiator circuit 90 commands the fuel injection system 14 to retard fuel injection timing (and to increase fueling respectively in order to maintain power output) or commands the fuel injection system 14 to initiate post-injections, which increase an amount of energy directed to the aftertreatment system 16 (i.e., increase the enthalpy intensity) without increasing EONOx. In another example, the initiator circuit 90 initiates LEON mode by reducing the common rail pressure in order to reduce production of NOx. In some embodiments, the initiator circuit 90 commands multiple components of the system 10 (in one embodiment, concurrently) in order to achieve or attempt to achieve low EONOx through the combined actuations of the commanded multiple components. For example, in these embodiments, the initiator circuit 90 may command an increased EGR amount, a retarded fuel timing, and an optimized common rail pressure targeting the desired EONOx/particulate matter tradeoff.

The LEON exit circuit 92 is configured or structured to receive information indicative of an operating status of the vehicle in which the system 10 is contained while the system 10 is operating in LEON mode, to determine when to disengage LEON mode, and to determine a subsequent operating mode. The information indicative of the operating status of the system 10 in LEON mode includes a temperature of the aftertreatment system 16, a temperature of the engine-out exhaust, a conversion efficiency of the SCR catalyst 22 (a NOx conversion efficiency), an amount of TPNOx (either accumulated or instantaneous), an amount of soot on the DPF 28, etc. The temperature of the aftertreatment system 16 may be based on at least one of a temperature of components of the aftertreatment system 16, including the SCR catalyst 22, the DOC 25, or the DPF 28. The conversion efficiency of the SCR catalyst 22 can be determined based on the temperature of the SCR catalyst or based on an amount of NOx in the exhaust measured by the NOx sensors 128 before the SCR catalyst 22 and after the SCR catalyst 22. The amount of soot of the DPF 28 may be estimated based on a mass flow rate of the exhaust measured by the flow rate sensors 127 before the DPF 28 and after the DPF 28 or on an exhaust pressure of the exhaust measured before the DPF 28 and after the DPF 28, or based on a lookup table containing estimated soot flux as a function of speed, load, environmental conditions, and other quantities during a certain operation period.

The LEON exit circuit 92 determines whether to disengage LEON mode based on a comparison of the information indicative of the operating status of the vehicle to one or more thresholds. In some embodiments, the LEON exit circuit 92 determines to disengage LEON mode and to engage normal operation when the temperature of the aftertreatment system 16 exceeds a warm-operation temperature threshold or when the conversion efficiency of the SCR catalyst 22 exceeds a warm-operation conversion efficiency threshold. In these embodiments, the LEON exit circuit 92 determines to disengage LEON mode and to engage normal operation because the controller 26 determines that the system 10 is prepared for warm-operation. The warm-operation temperature threshold refers to a temperature at which the SCR catalyst 22 is efficiently converting NOx in the exhaust (e.g., 200° C. above a predefined conversion efficiency value. If the temperature is not readily determined, the warm-operating temperature threshold may be determined as being exceeded based on the conversion efficiency exceeding a predefined value. The warm-operation conversion efficiency threshold refers to an acceptable conversion efficiency for the SCR. The acceptable conversion efficiency value may be defined by a regulation such that the SCR is desired to convert NOx to at or above the regulated value (e.g., 99%, meaning that 99% of the EONOx in the exhaust is reduced by the SCR system 20). As such, in some embodiments, the warm-operation temperature threshold is the same as the cold-operation threshold.

In other embodiments, the LEON exit circuit 92 determines to disengage the LEON mode and to engage the TM mode when the temperature of the aftertreatment system is below the warm-operation temperature threshold and the SCR catalyst conversion efficiency is below the warm-operation conversion efficiency threshold (i.e., the 'warm-operation parameters' are not met, such that the SCR catalyst 22 is not converting NOx at a predefined conversion efficiency value), but one or more of the other operating parameters are above their respective thresholds. These other operating parameters include an accumulated amount of EONOx, an accumulated amount of TPNOx, an estimated amount of soot on the DPF 28. For example, if the warm-operation parameters are below their respective thresholds but an accumulated amount of EONOx exceeds a LEON EONOx threshold, the LEON exit circuit 92 determines to disengage the LEON mode and to engage the TM mode because the controller 26 has determined that the LEON mode is not sufficient to warm the aftertreatment system 16 to warm-operation levels within the TPNOx budget. The accumulated amount of EONOx is determined according to the following formula:

$$\text{Accumulated } EONOx = \sum_{t=0}^{t_1} EO\dot{N}Oxdt \qquad (1)$$

where, t is equal to the time since the engine 12 is keyed on, this the time at which the accumulated amount of EONOx is determined (e.g., at SCR 22 light off), and EONOx is a rate of EONOx at an instant t in time. If the EONOx sensor has woken up (i.e., is active), the value of EONOx is based on an actual value received from that sensor. If the EONOx sensor is still asleep (i.e., inactive), the value of EONOx is determined using a stored steady-state EONOx map in which a value of EONOx can be estimated based on a speed and/or load of the engine 12. In this example, TPNOx can be used instead of EONOx, such that an accumulated amount of TPNOx is compared against a LEON TPNOx threshold, and such that TPNOx can be used in the place of EONOx for formula 1.

In other embodiments, the LEON exit circuit 92 determines to disengage LEON mode and to engage TM mode if the warm-operation parameters are below their respective thresholds but the amount of soot build-up on the DPF 28 has exceeded a LEON soot threshold. The LEON soot threshold may be a pre-defined value based on an amount of soot accumulation at which desired exhaust flow rate is possible from an engine/aftertreatment performance as well as aftertreatment protection standpoints. Because less heat energy is directed to the aftertreatment system 16 during LEON mode, more soot builds up on the DPF 28 due to the lack of passive regeneration (i.e., less soot is burned off of the DPF 28). Additionally, the LEON combustion process itself may produce more soot than when the system is in normal operation mode, as a combination of a cold engine, higher levels of EGR, retarded injection and potentially lower injection pressure serve to reduce NOx at the expense of higher soot production. Soot build-up on the DPF 28 is disadvantageous for engine 12 performance because soot on the DPF 28 restricts exhaust flow causing an increase in pumping work and thus increase in fuel consumption. As such, if the LEON exit circuit 92 determines than the amount of soot buildup is negatively affecting engine 12 or aftertreatment system 16 performance (based on the amount of soot build-up on the DPF 28 exceeding a LEON soot threshold), which in some extreme case can cause a catastrophic DPF 28 failure where a thermal event (such as suddenly higher exhaust temperatures) could generate a high level of exotherm by igniting the accumulated carbon deposits and melting the DPF 28 material, the LEON exit circuit 92 determines to disengage LEON mode and to engage TM mode, in which higher amounts of energy directed to the aftertreatment system 16 to burn off some of the accumulated soot deposits.

The LEON exit circuit 92 engages TM mode by sending command signals to various components of the system 10 to adjust performance. For example, the LEON exit circuit 92 engages TM mode by "overclosing" the VGT of the turbocharger 30, which has the effect of choking the engine, thus requiring significant overfueling (i.e., increasing the fueling amount above standard amounts) in order to maintain the desired power output. Some of the excess fuel energy generated by the overfueling (i.e., the amount of fuel energy not directed to generating power output) is directed to warming the aftertreatment system 16. In one example, the LEON exit circuit 92 commands the EGR system 18 to reduce an EGR amount returned to the combustion chambers 13. However, if the LEON exit circuit 92 has overclosed the VGT of the turbocharger, the increase in pressure on the engine 12 makes it difficult to control EGR flow, so commands to deliver the same high levels of EGR amount as LEON may not be combined with commands to overclose the VGT.

The TM exit circuit 94 is configured or structured to receive information indicative of an operating status of the vehicle in which the system 10 is contained while the system 10 is operating in TM mode and to determine when to disengage LEON mode for the normal operation mode based on the received information. Normal operation mode refers to a standard operation for the engine where the system 10 is not operating in a special operation mode (e.g., LEON mode or TM mode). The information indicative of the operating status of the system 10 in TM mode includes a temperature of the aftertreatment system 16, temperatures of components of the aftertreatment system 16 (most notably of the SCR catalyst 22), and the conversion efficiency of the SCR catalyst 22. In some embodiments, the TM exit circuit 94 determines to disengage TM mode and to engage normal operation when the temperature of the aftertreatment system 16 exceeds the warm-operation temperature threshold or when the conversion efficiency of the SCR catalyst 22 exceeds the warm-operation conversion efficiency threshold. In some of these embodiments, the TM exit circuit 94 determines this as an either/or function, such that only one of the aftertreatment system 16 temperature or the SCR catalyst 22 conversion efficiency exceeds their respective threshold in order to disengage TM mode. In other embodiments, the TM exit circuit determines this based on both of the aftertreatment system 16 temperature and the SCR catalyst 22 conversion efficiency exceeding their respective thresholds in order to disengage the TM mode. In these embodiments, the TM exit circuit 94 determines to disengage TM mode and to engage normal operation because the controller 26 determines that the system 10 is prepared for warm-operation.

Figure 3:
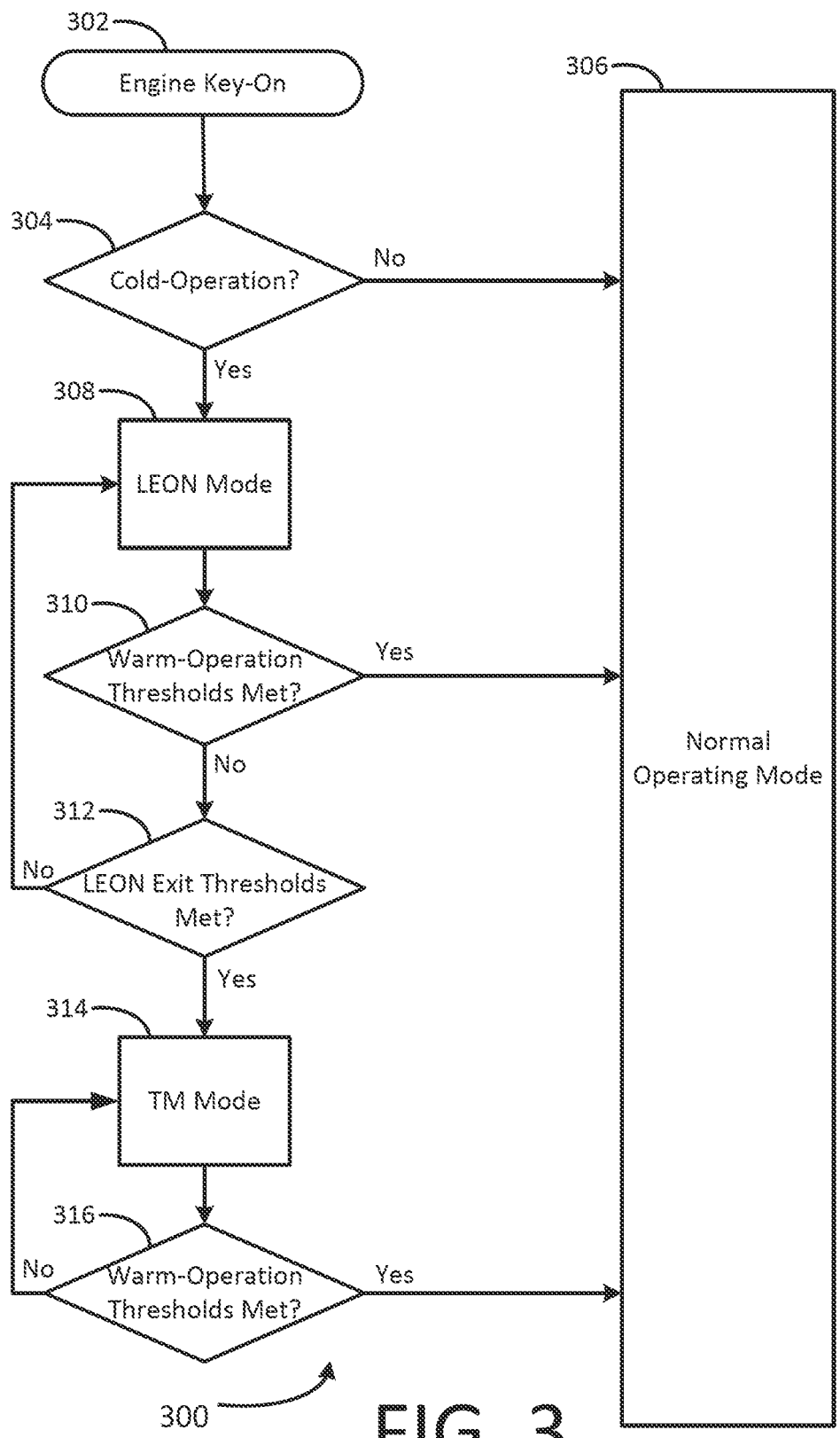
FIG. 3 is a flow diagram of a method for reducing an accumulated amount of NOx during cold operation, according to an exemplary embodiment.

Referring now to FIG. 3, a method 300 for reducing an accumulated amount of NOx during cold operation, which is defined as a period of time from engine 12 key-on until when the aftertreatment system 16 (particularly the SCR catalyst 22) reaches an operational temperature, is shown. In some embodiments, the method may be performed by the controller 26 of FIGS. 1-2. The method 300 begins at 302, when the engine 12 is keyed-on. Then, at 304, the controller 26 determines whether the system 10 is beginning in cold operation. This determination is made based on an evaluation of current temperatures of the aftertreatment system 16 and/or of the ambient air, and a comparison of these temperatures to thresholds. For example, if the controller 26 determines that the current temperature of the aftertreatment system 16 exceeds a warm-operation threshold, the controller 26 determines that the system 10 is not in cold operation and the method proceeds to 306 (304: NO). Alternatively, if the current temperature is below a warm-operation threshold, the controller determines that the system 10 is starting in cold operation and proceeds to initiate LEON mode at 308 (304: YES).

At 308, the controller 26 engages LEON mode by commanding one or more components of the system 10. The method 300 then proceeds to 310, where the controller 26 determines if warm-operation thresholds have been met. The determination at 310 is similar to the determination made at 304, in that if the thresholds are met (e.g., temperature of aftertreatment system 16 above warm-operation threshold), the method proceeds to 306 and engages normal operation mode (310: YES). If the determination at 310 is that the thresholds for warm operation have not been met, the method 300 proceeds to determine whether thresholds for exiting LEON mode have been met (310: NO).

At 312, the controller 26 determines whether to exit LEON mode based on an evaluation of current operating parameters indicative of a status of the system 10 during LEON mode. For example, if the estimated SONOx cumulatively (i.e., since the system 10 started or another predefined operating period) exceeds a LEON exit threshold, then the controller determines to exit LEON mode at 312 and to engage TM mode at 314 (312: YES). Alternatively, if the amount of estimated SONOx does not exceed the relevant threshold, the method 300 returns to 308 (312: NO) and continues LEON mode. Here, the amount of estimated SONOx may be based on a SONOx sensor (if the sensor is active), on a EONOx sensor, and/or on a lookup table of EONOx values based on engine 12 operation. In another example, if the amount of soot deposits that have accumulated on the DPF 28 exceed a LEON exit threshold, then the controller determines to exit LEON mode at 312 and to engage TM mode at 314 (312: YES). Alternatively, if the amount of soot deposits on the DPF 28 do not exceed the relevant threshold, the method 300 returns to 308 (312: NO) and continues LEON mode. As such, the method 300 cycles through steps 308-312 until either 310 or 312 are YES.

At 314, the controller 26 engages TM mode by commanding one or more components of the system 10 in order to direct a greater amount of fuel energy to the aftertreatment system 16 by overfueling the engine through adding a restriction on the exhaust by overclosing the VG turbo (or by closing an exhaust throttle valve on a non VG turbo). The method 300 then proceeds to 316, where the controller 26 determines if warm-operation thresholds have been met. This determination is similar to those determinations made at 304 and 310 in that if the warm-operation thresholds are met, the method 300 proceeds to 306 and engages normal operation mode (316: YES). If the warm-operation thresholds are not met, the method 300 returns to 314 and continues TM mode, thereby continuing in TM mode until the warm-operation thresholds are met. At no point in method 300 does the controller 26 disengage TM mode and engage LEON mode (i.e., the path from LEON mode to TM is a one-way street).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIGS. 2, it should be understood that the controller 26 may include any number of circuits for completing the functions described herein. For example, the activities and functionalities of the initiator circuit 90, the LEON exit circuit 92, and the TM exit circuit 94 may be combined in multiple circuits or as a single circuit. Additional circuits with additional functionality may also be included. Further, the controller 26 may further control other activity beyond the scope of the present disclosure.

As mentioned above and in one configuration, the "circuits" may be implemented in machine-readable medium for execution by various types of processors, such as the processor 52 of FIG. 2. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A method, comprising:
   initiating a low engine-out NOx (LEON) mode by controlling a component of a vehicle having an aftertreatment system to decrease an instantaneous engine-out NOx (EONOx) amount;
   comparing a temperature of the aftertreatment system to a warm-operation threshold temperature;
   responsive to determining that the temperature of the aftertreatment system exceeds the warm-operation threshold temperature, disengaging the LEON mode;
   responsive to determining that the temperature of the aftertreatment system is below the warm-up operation threshold temperature, comparing information indicative of an operating status of the vehicle to a LEON exit threshold, wherein the information indicative of the operation status of the vehicle comprises a NOx value and the LEON exit threshold comprises a NOx value threshold; and
   disengaging the LEON mode responsive to determining that the information indicative of the operating status of the vehicle exceeds the LEON exit threshold.

2. The method of claim 1, wherein the information indicative of the operating status of the vehicle further comprises at least one of the temperature of the aftertreatment system of the vehicle, a temperature of exhaust gas exiting an engine of the vehicle, a conversion efficiency of a selective catalytic reduction (SCR) catalyst of the aftertreatment system, or an amount of system-out NOx.

3. The method of claim 1, wherein the NOx value is a system out NOx (SONOx) value, and wherein the NOx value threshold is a SONOx value threshold.

4. The method of claim 3, further comprising:
   receiving information regarding an EONOx value; and
   estimating the SONOx value based on the EONOx value.

5. The method of claim 1, wherein the information indicative of the operating status of the vehicle further comprises an accumulated amount of EONOx, wherein the LEON exit threshold further comprises an accumulated EONOx threshold, and wherein the method further comprises:
   disengaging the LEON mode responsive to a first to occur of the NOx value exceeding the NOx value threshold or the accumulated amount of EONOx exceeding the accumulated EONOx threshold.

6. The method of claim 1, wherein the temperature of the aftertreatment system is a catalyst temperature, and wherein the LEON exit threshold further comprises a catalyst threshold temperature that corresponds to a predetermined conversion efficiency of a catalyst member of the aftertreatment system.

7. The method of claim 6, wherein disengaging the LEON mode is responsive to at least one of (i) the catalyst member temperature being below the catalyst threshold temperature or (ii) the NOx value exceeding the NOx value threshold.

8. A system comprising:
   a controller coupled to an aftertreatment system, the controller configured to:
   initiate a low engine-out NOx (LEON) mode by controlling a component of a vehicle having the aftertreatment system to decrease an instantaneous engine-out NOx (EONOx) amount;
   compare a temperature of the aftertreatment system to a warm-operation threshold temperature;
   responsive to determining that the temperature of the aftertreatment system exceeds the warm-operation threshold temperature, disengage the LEON mode;
   responsive to determining that the temperature of the aftertreatment system is below the warm-up operation threshold temperature, compare information indicative of an operating status of the vehicle to a LEON exit threshold, wherein the information indicative of the operation status of the vehicle comprises a NOx value and the LEON exit threshold comprises a NOx value threshold; and
   disengage the LEON mode responsive to determining that the NOx value exceeds the NOx value threshold.

9. The system of claim 8, wherein the information indicative of the operating status of the vehicle further comprises at least one of the temperature of the aftertreatment system of the vehicle, a temperature of exhaust gas exiting the component of the vehicle, a conversion efficiency of a selective catalytic reduction (SCR) catalyst of the aftertreatment system, or an amount of system-out NOx.

10. The system of claim 8, wherein the NOx value is a system out NOx (SONOx) value, and wherein the NOx value threshold is a SONOx value threshold.

11. The system of claim 8, wherein the NOx value is an accumulated amount of EONOx, and wherein the NOx value threshold is an accumulated EONOx threshold.

12. The system of claim 8, wherein the controller is further configured to enable a thermal management mode responsive to disengaging the LEON mode, the thermal management mode comprising one or more of over-fueling the component of the vehicle or restricting the flow of exhaust gas exiting the component of the vehicle.

13. The system of claim 12, wherein the controller is further configured to disengage the thermal management mode responsive to determining that the temperature of the aftertreatment system exceeds the warm-operation threshold temperature.

14. A non-transitory computer readable medium having computer-executable instructions embodied therein that, when executed by at least one processor of a computing system, cause the computing system to perform operations comprising:
   initiating a low engine-out NOx (LEON) mode by controlling a component of a vehicle having an aftertreatment system to decrease an engine-out NOx (EONOx) amount;
   comparing a temperature of the aftertreatment system to a warm-operation threshold temperature;
   responsive to determining that the temperature of the aftertreatment system exceeds the warm-operation threshold temperature, disengaging the LEON mode;
   responsive to determining that the temperature of the aftertreatment system is below the warm-up operation threshold temperature, comparing information indicative of an operating status of the vehicle to a LEON exit threshold, wherein the information indicative of the operation status of the vehicle comprises a NOx value and the LEON exit threshold comprises a NOx value threshold; and
   disengaging the LEON mode responsive to determining that the information indicative of the operating status of the vehicle exceeds the LEON exit threshold.

15. The non-transitory computer-readable medium of claim 14, wherein the information indicative of the operating status of the vehicle comprises at least one of the temperature of the aftertreatment system of the vehicle, a temperature regarding exhaust gas exiting an engine of the vehicle, a conversion efficiency of a selective catalytic reduction (SCR) catalyst of the aftertreatment system, or an amount of system-out NOx.

16. The non-transitory computer-readable medium of claim 14, wherein the NOx value is a system-out NOx (SONOx) value from the vehicle, and wherein the NOx value threshold is a SONOx value threshold.

17. The non-transitory computer-readable medium of claim 16, wherein the instructions, when executed by the at least one processor of the computing system, further cause the computing system to perform operations comprising determining the SONOx value based on at least one of a SONOx sensor value received from a SONOx sensor or an EONOx sensor value received from an EONOx sensor.

18. The non-transitory computer-readable medium of claim 16, wherein the instructions, when executed by the at least one processor of the computing system, further cause the computing system to perform operations comprising determining the SONOx value based on an EONOx value and an amount of time between a cold start condition of the component and a warm operation condition of the component.

19. The non-transitory computer-readable medium of claim 16, wherein the cold start condition corresponds to a first time value occurring when the temperature of the aftertreatment system is at or near a low temperature threshold.

20. The non-transitory computer-readable medium of claim 19, wherein the warm operation condition of the component corresponds to a second time value occurring when the temperature of the aftertreatment system is at or near the warm-operation threshold temperature.

\* \* \* \* \*